April 12, 1927.
W. P. BRETT
1,624,527
PUMPING MECHANISM
Filed Jan. 29, 1926
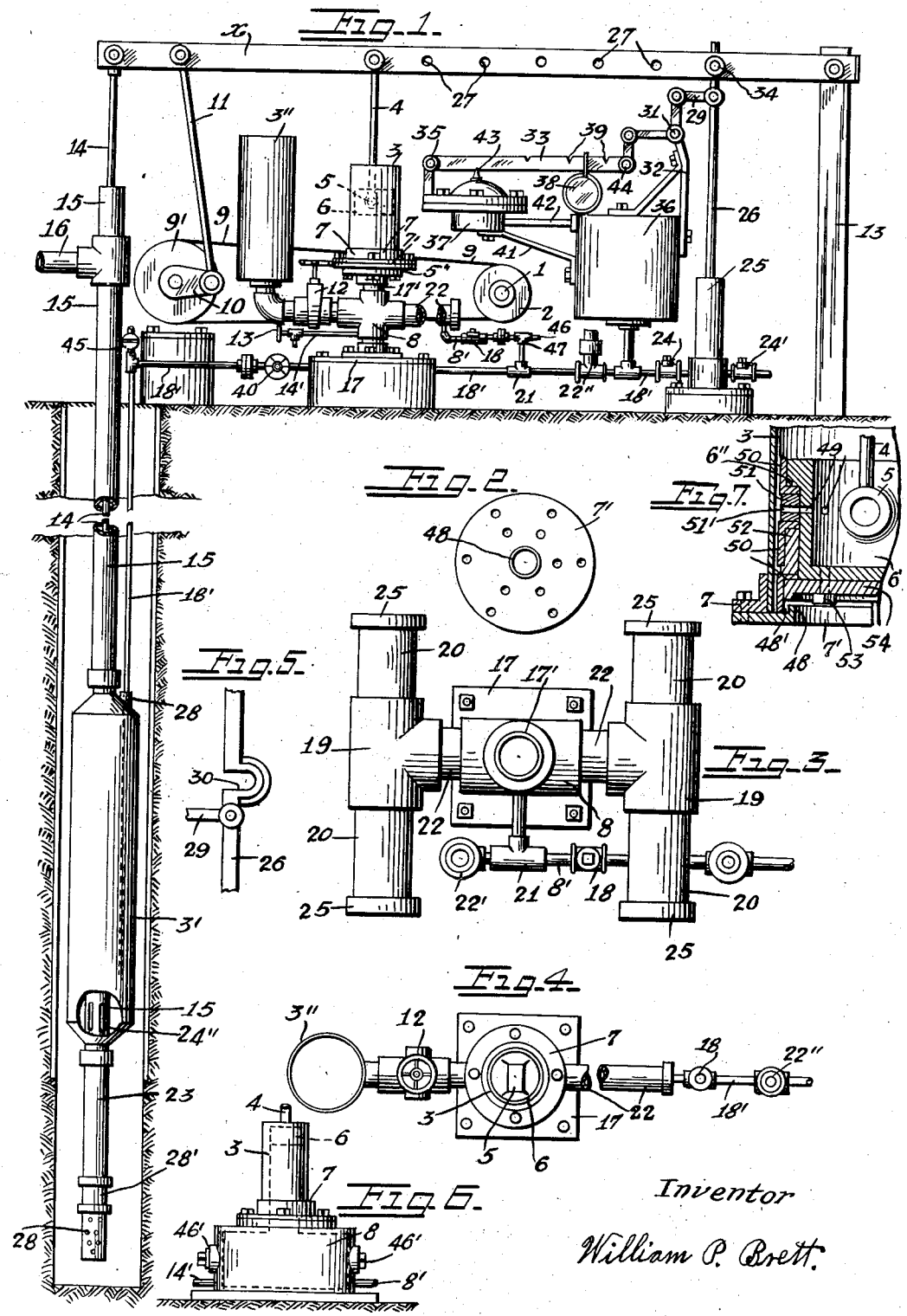
Inventor
William P. Brett Patented Apr. 12, 1927.

1,624,527

UNITED STATES PATENT OFFICE.

WILLIAM P. BRETT, OF DECATUR, ILLINOIS.

PUMPING MECHANISM.

Application filed January 29, 1926. Serial No. 84,648.

My invention relates to single stroke pumps, substantially as shown and claimed in my pending application for "Deep well pumping mechanism" Serial No. 658,461 filed Aug. 20, 1923, and the objects of my present improvements are, first to provide details of improved construction tending to economy in manufacture and endurance in operation; and second to provide a pumping mechanism of the type described that is adapted to work successfully and economically under various local conditions in either deep or shallow wells.

I attain these objects by the mechanism illustrated in the accompanying drawings, in which—

Fig. 1 is a side view of an installation shown partly in a well and partly above ground; Fig. 2 is a plan view of the plate 7' of Figure 1; Fig. 3 is a top or plan view of a modified form of the load equalizing air chamber the part 3 and connecting flanges 5' and 7' having been removed and the pressure regulator 22'' installed in the air line 8'; Fig. 4 is a top or plan view of the form of equalizer shown in Figure 1 the pitman 4 and walking beam X having been removed and the pressure regulator 22'' installed in the air line 8'; Fig. 5 is an enlarged side view of the upper part of the air pump pitman 26; Fig. 6 is a side view of another modified form of a load equalizing air chamber; and Fig. 7 is a vertical sectional view through parts of the piston 6, cylindrical part 3 of the air chamber and the connecting plate 7'.

In the drawings 1 denotes a motor shaft carrying a drive pulley 2; 3 is a load equalizing air cylinder; 4 is a pitman pivoted at its lower end on the wrist pin 5 in the oil reservoir 6' formed by the body of the piston 6; 7 is a flange adapted to secure the air cylinder 3 to the plate 7' which is secured to the flange 5' of the air chamber 8; 9 is a belt mounted on pulleys 2 and 9' for actuating beam X by means of the crank 10 and the pitman 11; 12 is a gate valve for closing or opening comunication between the air chambers 8 and 3''; 3' is a shock alleviating air reservoir adapted to be submerged with the pump cylinder; 13 is a valve in the pipe 14' for draining the air chamber 8; 14 is the sucker rod for actuating the water pump piston and operates in the water discharge pipe or column 15; 16 is the discharge part of the water pipe; 17 is the base or foundation plate for the air chamber 8 and parts connected therewith; 17' a nipple pipe connection between air chamber 8 and flange 5'; 18 is a check valve in the air line 8' leading into the air chamber 8; 19 and 19 are T fittings and 20, 20 are pipe or nipples forming parts of air chambers auxiliary to chamber 8 in Fig. 3; 21 is a T fitting in the air line 18'; 22 is a pipe extension to the air chamber 8 in Figs. 1, 3 and 4 and may be of any desired length; 22' is a safety valve in the air line 8' as shown in Figure 3; 22'' is a safety valve or pressure regulator in the air line 18' between the branch line leading into air reservoir 36 and the T fitting 21 as shown in Figure 1 or it may be put in the branch line 8' as shown in Figures 3 and 4; 23 is the water pump cylinder; 24 is the discharge and 24' is the intake valve for the air pump or compressor 25; 24'' are water ports leading from the pipe 15 into the lower part of the air reservoir 3'; 26 is the pitman for actuating the piston in the air compressor 25; 27 denotes pivot holes in the walking beam X; 28 is the strainer and 28' is the foot valve of the water pump; 29 is a link connection between bell crank 31 and pitman 26; 30 is a hook-up notch in pitman 26 for engagement with pivot pin 34; 31 is a bell crank lever pivoted to the bracket 32; 33 is the regulating lever pivoted at 35 on the diaphragm regulator; 36 is an air reservoir or receiver; 37 is the body part of a diaphragm regulator and 38 is the weight for the regulator; 39 are notches in the regulator lever 33; 40 is a control valve in the air line 18'; 41 is a bracket brace for the regulator 37; 42 is the air line leading from the reservoir 36 to the regulator 37; 43 is the diaphragm post for carrying the lever 33; 44 is the link connecting lever 33 and bell-crank lever 31; 45 is an air valve for determining as to the air volume in air reservoir 3'; 46 is a plug in the T fitting 47 in the branch air line 8'; 46' are plugs for the lateral openings in the modified form of air chamber 8 as shown in Figure 6; 48 is a vertical circular flange on the plate 7' as shown in Figures 2 and 7 and forms one of the walls of the circular oil receptacle 48'; 49 are oil ducts leading from the oil reservoir 6' to the circular oil space 51' that surrounds the piston 6 between the cup leather rings 50; 51 and 52 are metal clamping rings which in connection with the plate 54 and cap screws 53 and shoulder 6'' at the top of the piston 6 binds the packing rings 50 firmly in place on the piston 6.

In operation the motor actuated shaft 1 by means of pulley 2, belt 9, pulley 9', crank 10 and pitman 11 imparts a reciprocating motion to the walking beam X which is pivoted at one end to the upper end of the post 13 and at the other end to the sucker rod 14 which actuates the piston in the pump cylinder 23 for forcing water through pipe 15 and causing it to discharge through pipe 16. The walking beam X also actuates the piston 6 in the load equalizing air cylinder 3 and the piston of the air compressor 25. The pressure of the air in reservoir 36 as it comes from the compressor 25 is regulated by the diaphragm regulator 37 and connecting parts which actuate the pitman 26 in lateral movement to engage or disengage the pivot pin 34 in the walking beam X by means of the slot 30, the weight 38 being adjusted on lever 33 to maintain the required pressure for the respective installations. 22'' is a pressure regulator in the air line 18' as shown in Figure 1 or it may be located in the branch air line 8' as shown in Figures 3 and 4 and is set so as to maintain a pressure in the load equalizing air chamber 8 and air cylinder 3 of a lower pressure than the pressure in the receiver 36 but ample to cause the piston 6 to carry the weight of the beam X and its connected parts and substantially one half of the weight of the column of water that is contained in the water pipe 15 during the operation of the pumping mechanism, thus on the up stroke of the crank 10 it will carry only substantially one half of the weight of the water in the pipe 15 and the piston 6 as actuated by the air pressure from below will carry the balance of the water and the beam X and its connected parts, and on the down stroke of the crank 10 it will have to apply a pulling force equal to substantially one half of the weight of the column of water in the pipe 15 in order to force the piston 6 down against the air pressure below in the air cylinder and air chamber 8; and thus it is seen that the working load on the crank and motor is substantially equal on both the up and down strokes of the crank.

The air line 18' extends down in the well and into the shock alleviating air chamber 3' terminating as denoted at 45' near and above the water ports 24'' thus making possible the determination as to whether the proper working volume of air is in the chamber 3' or not by closing valve 40 and opening valve 45 for but a moment.

The volume of compressed air in chamber 3' will be compressed to a certain extent by the up stroke of the piston in pump cylinder 23 allowing substantially one half of the volume of water to pass through the ports 24'' into the air chamber 3' thus increasing the pressure so as to more than balance the pressure of water in the pipe 15 so that on the down stroke of the pump piston this surplus water in the chamber 3' will be discharged back into the pipe 15 causing a substantially continuous flow of water therein, thus alleviating the shock that would result from having to put a dead body of water in motion at each up stroke of the piston.

The load equalizing air chamber 8 shown in the several modified forms in connection with the several modifications of auxiliary air chambers constitutes a large clearance space or air chamber in constant open communication with the air cylinder 3 with provision made for varying the volume of the air chamber by means of a valve as 12 shown in Figure 1 for closing or opening communication between the chambers; the compressed air forced into these chambers has no way of escape and remains confined as a pulsating means for absorbing and giving out force in equalizing the load on the motive parts of the pumping mechanism. This feature of varying the volume of the clearance space gives the apparatus a wide range of useful application to meet the various local conditions of the respective installations. In this apparatus three different air pressures may be maintained and varied to suit the local pumping conditions of the respective localities in which it may be installed.

The pressure in the receiver 36 is automatically regulated by the regulator 37, the pressure in the air line 8' and chambers 8 and 3'' is determined by the regulators 22' and 22'' as shown in Figures 1 and 3 and the pressure in the air chamber 3' is determined by the weight of the column of water in the pipe 15. When local conditions are such that the pressure in chamber 3' is sufficient to serve its purpose in the chamber 8 the valve 40 (see Fig. 1) may be left open continuously and the controller 22'' set according to the pressure required for a very small surplus of air to pass through it, but when a higher pressure is required in chamber 8 than in chamber 3' the valve 40 is opened only for a moment at infrequent intervals to replenish the supply of air in chamber 3'.

The regulator or safety valve 22' shown in Figure 3 may be used instead of the hand operated relief valve 13, shown in Figure 1, to give automatic relief to any excessive pressure resulting from any accumulation of water or oil in the air chamber 8.

The body part of the piston 6 in the load equalizing air cylinder 3 is made in cup shape and forms an oil reservoir 6' in which the wrist-pin 5 is centrally mounted and continuously submerged in the oil carried therein. The cup leather packing rings 50 encompass the piston and are firmly held in place by the metal spacing rings 51 and 52 all of which are clamped between the plate 54, at the bottom of the piston and the shoulder 6″ at the top of the piston body.

The lower cup leather packing ring 50 projects so as to come in contact with the oil in the circular oil receptacle 48′ at each stroke of the piston and the oil ducts 49 lead from reservoir 6′ into the piston encompassing circular space 51′ between the ring 51 and the wall of the cylinder 3 thus providing lubrication and a perfect oil seal to prevent leakage of air past the piston.

I am aware that prior to my invention pumping mechanism has been made with load equalizing and shock alleviating devices in connection with cylinder pumps of the single stroke type. I therefore do not claim such a combination broadly, but

I claim:

1. The combination, in pumping mechanism, of a load equalizing air cylinder adapted to receive and retain air above atmospheric pressure, a piston adapted to reciprocate in said cylinder and cause fluctuations in pressure and volume of the said compressed air and to be actuated in one direction by the expansive force of said retained air, a clearance space at one end of said cylinder, and means for increasing and decreasing the volume of said clearance space.

2. The combination, in pumping mechanism, of a load equalizing air cylinder adapted to receive and retain compressed air, a piston adapted to reciprocate in said cylinder and be motor actuated in one direction and to be moved in the opposite direction by the expansive force of said compressed air, a clearance space on the air pressure side of said piston, and means for connecting auxiliary air retainers in communication with said clearance space.

3. The combination, in pumping mechanism, of a load equalizing air cylinder in continuous open communication with the atmosphere at one end, a piston adapted to reciprocate in said cylinder and to be motor actuated in one direction and moved in the opposite direction by the expansive force of compressed air, a clearance space on the compressed air side of said piston, and means for maintaining a predetermined air pressure in said clearance space in excess of atmospheric pressure.

4. The combination, in pumping mechanism, of an air chamber, a load equalizing air cylinder in open communication with said air chamber, a source of supply of compressed air, and means for maintaining a predetermined air pressure in said chamber and cylinder in excess of atmospheric pressure but of a less pressure than the said source of supply.

5. The combination, in pumping mechanism, of a load equalizing air cylinder, a water pump cylinder, a shock alleviating air reservoir adjacent to said pump cylinder, and means for maintaining a minimum air pressure in said air cylinder in excess of the maximum working air pressure in the said shock alleviating air reservoir.

6. The combination, in pumping mechanism, of a pump cylinder, a shock alleviating air reservoir, a load equalizing air chamber, a source of supply of compressed air, an air line leading from said source of compressed air supply into said air chamber and air reservoir, and means for maintaining various predetermined air pressures in said load equalizing air chamber and a predetermined volume of air in the said air reservoir.

7. The combination, in pumping mechanism, of a pump cylinder, a load equalizing air chamber, a piston adapted to reciprocate in a part of said air chamber, another piston adapted to reciprocate in said pump cylinder, means for alternating the working strokes of said pistons, and means for changing or varying the holding capacity or volume of said air chamber.

8. The combination, in pumping mechanism, of a pump, a load equalizing air chamber, a piston adapted to reciprocate in a part of said air chamber, packing rings surrounding said piston, an oil reservoir occupying the body portion of said piston, an oil space surrounding said piston above said packing rings an oil duct or channel leading from said oil reservoir into said oil space and means for actuating said pump and piston in synchronism.

9. The combination, in pumping mechanism, of a pump, a load equalizing air chamber, a piston adapted to reciprocate in a part of said air chamber, an oil reservoir in said air chamber below said piston, and means for actuating said pump and piston in synchronism.

10. The combination, in pumping mechanism, of a pump, a load equalizing air chamber, a piston adapted to reciprocate in a part of said air chamber, an oil space on the outside of said piston, an oil reservoir within the body part of said piston, an oil channel leading from said reservoir into said oil space, packing rings above and below said oil space and carried by said piston, and means for actuating said pump and piston in synchronism.

11. The combination, in pumping mechanism, of a pump, an air compressor, a load equalizing air chamber, an air receiver or storage tank for compressed air, and automatic means for maintaining a predetermined air pressure in said receiver and a different predetermined air pressure in said chamber during the operation of said pump.

12. The combination, in pumping mechanism, of a pump, a working barrel or cylinder for said pump, a shock alleviating air reservoir adjacent to said cylinder, a load equalizing air chamber, an air receiver or storage tank for compressed air, and means for maintaining a predetermined air pressure in said air chamber equal to or less than the pressure in said storage tank and an air pressure in said air reservoir equal to or less than the pressure in said air chamber.

13. The combination, in pumping mechanism, of a pump, a load equalizing air chamber, an oil receptacle in said air chamber, a piston carrying an oil reservoir and adapted to reciprocate in a part of said air chamber and to contact with the oil in said receptacle at the lower limit of its range of action, means for maintaining a predetermined air pressure in said air chamber above atmospheric pressure, and means for actuating said pump and piston in synchronism.

14. The combination, in pumping mechanism, of a pump, a load equalizing air chamber, a piston adapted to reciprocate in a part of said air chamber, an oil reservoir comprising the body part of said piston, and means for actuating said pump and piston in synchronism.

15. The combination, in pumping mechanism, of a pump, a load equalizing air chamber, a piston adapted to reciprocate in a part of said air chamber, an oil space or reservoir surrounding the body part of said piston, and means for actuating said pump and piston in synchronism.

16. The combination, in pumping mechanism, of a pump, a load equalizing air chamber, a reciprocating member adapted to cause compression and allow expansion of the air in said chamber, means for increasing and decreasing the volume of said air chamber, and means for actuating said pump and reciprocating member in synchronism.

Signed at Decatur, in the county of Macon, and State of Illinois, this the 1st day of May, 1926.

WILLIAM P. BRETT.